United States Patent Office 2,790,554
Patented Apr. 30, 1957

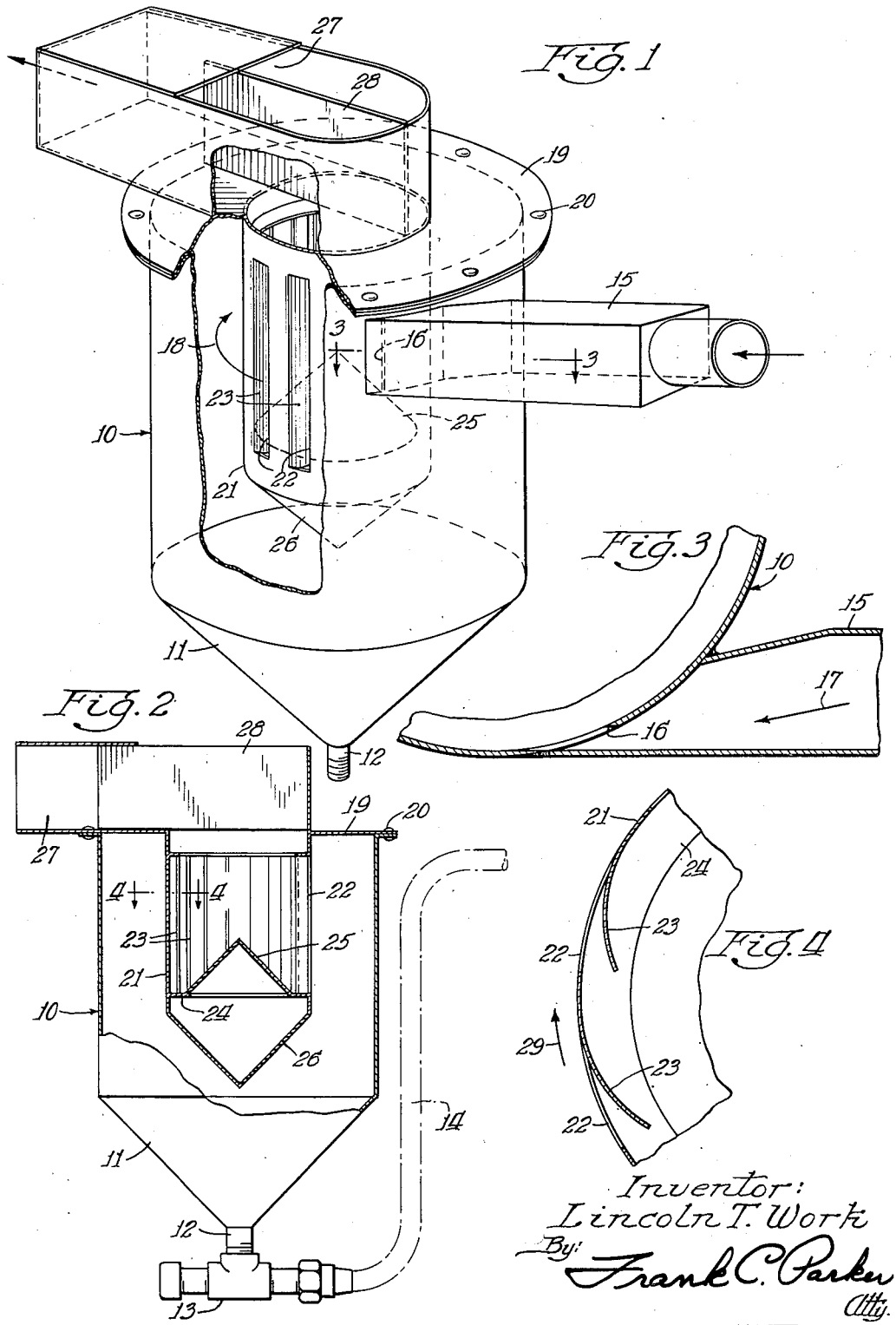

2,790,554

SEPARATING DEVICE

Lincoln T. Work, Maplewood, N. J., assignor to Borg-Warner Corporation, Chicago, Ill., a corporation of Illinois Application January 18, 1955, Serial No. 482,467

3 Claims. (Cl. 210—294)

The present invention relates generally to separator devices and is particularly concerned with devices for separating relatively heavy solid particles from a liquid.

The principal object of the present invention is to provide an improved device for separating relatively heavy solid particles maintained in suspension in a liquid.

A more specific object of the present invention is to provide a separating device in accordance with the preceding object wherein means are provided for centrifuging the liquid having the solid particles suspended therein and other means are provided for changing the direction of rotation of the centrifuged liquid to thereby facilitate removal of liquid and fine solids free of the heavy solid particles which are thrown outward and then settle to the bottom of a container within which the liquid is disposed.

A further more detailed object of the present invention is to provide a separator in accordance with the preceding objects and including means for improving the centrifuging action.

A further object of the present invention is to provide a separating device capable of removing a higher percentage of foreign solid particles suspended in a liquid than other similar known devices are capable of removing.

A further object of the present invention is to provide means for regulating the flow of sludge, containing the undesirable solid particles, from the separating device so as to control the overall effectiveness of the device.

In the earth bore drilling industry it is conventional practice to utilize a mud fluid which is pumped down through an earth boring drill pipe string into an earth bore hole, which drilling mud fluid is effective to wash away the formation fragments removed at the bottom of the bore by the drill and to float these fragments to the surface while they are maintained in suspension in the mud fluid. In order to render the mud fluid capable of being used again it is necessary to remove these formation fragments therefrom and it is in this connection that the present invention finds one of its more particularly desirable uses.

One of the advantages of the present invention over similar known devices is the provision of means as an integral part of the separator for providing improved centrifuging action of the fluid.

The foregoing and numerous other objects and advantages of the present invention will become apparent from the following detailed description thereof, wherein:

Fig. 1 is a perspective view illustrating the principal features of the present invention;

Fig. 2 is a side elevational view, shown substantially entirely in section, and better illustrating certain of the features of the separator disclosed in Fig. 1;

Fig. 3 is a fragmentary sectional view taken substantially along the line 3—3 in Fig. 1; and Fig. 4 is a sectional view taken substantially along the line 4—4 in Fig. 2 and looking in the direction of the arrows.

Referring now to the drawings wherein the same reference numerals have been utilized to identify identical parts in the different views, the present invention comprises a separating device which includes an outer substantially cylindrical chamber indicated generally by reference numeral 10. The cylindrical chamber 10 is provided with a generally conically shaped tapered bottom portion 11 having its apex 12 directed generally downwardly. The apex 12 comprises a discharge outlet having a valve device 13 secured thereto with a discharge hose 14 connected with the valve 13.

The cylindrical chamber 10 is provided with a liquid inlet 15 suitably secured to the cylinder 10, as by welding, for example, and this inlet 15 communicates with the inside of the cylinder 10 through a suitable opening 16 formed in the side of the cylinder 10. It will be noted that the liquid inlet 15 meets the cylinder 10 substantially tangentially so that as the liquid flows into the cylinder through the inlets 15 and opening 16, as indicated by arrows 17 and 18, the liquid is caused to rotate in the cylinder 10.

The cylinder 10 is provided with a cover 19 suitably secured thereto in any well known manner, as by rivets or bolts 20, for example, and an inner cylindrical member 21 supported by the cover 19 is disposed within the outer cylinder 10 and maintained substantially concentrically with respect thereto.

The inner cylinder 21 is provided with a plurality of axially extending peripheral openings 22 for enabling fluid communication from chamber 10 to within the inner chamber 21. Each of the openings 22 is formed by making a three sided cut in the cylinder 21 with the resultant window of material being pressed inwardly to form a vane 23 corresponding to each of the openings 22. It is also possible to attain the same functional configuration of the vanes by welding the parts together. The upper and lower openings between the vanes and the cylinder may be closed so as to rigidify the vanes by welding V-plates between the vanes and the cylinder.

The inner cylinder 21 is provided with a bottom comprising an annular flat portion 24, an upwardly projecting generally conical portion 25 and a downwardly projecting generally conical portion 26. It will be noted that the conical portion 26 is substantially concentric with respect to the conical portion 11 of the outer cylinder 10 and it has been found that by so providing the inner cylinder 21 with the downwardly projecting conical portion 26, better centrifuging action of the liquid within the cylinder 10 in the lower regions thereof is obtained than in the case where the bottom of the inner cylinder 21 is merely flat.

The upper end of the inner cylinder 21 is open and communicates with an overflow passage 27. The overflow passage 27 is provided with a baffle plate 28 extending across the upper end of the inner cylinder 21 for the purpose of tending to minimize turbulence in the liquid as it overflows from the inner cylinder 21.

When the present separating device is utilized for the purpose of separating sand or other heavy solid particles from a liquid comprising mud fluid, such as is conventionally utilized in earth bore drilling operations, the liquid entering the inlet 15 is under a slight pressure head, as for example of the order of 5 to 10 feet. The entering liquid therefore flows into the cylinder 10 and inasmuch as the inlet 15 is disposed tangentially with respect to the cylinder 10 the liquid is caused to revolve within the cylinder 10. Since the main outlet for the cylinder 10 is through the overflow passageway 27 liquid must proceed into the inner cylinder 21 in order to escape from the cylinder 10. It will be noted that the rotation of the liquid within the cylinder 10 is in a clockwise direction as viewed in Fig. 1 and the vanes 23 are so directed as to cause a substantial reversal of the direction of flow of the liquid, as indicated by arrow 29 in Fig. 4, in order for the liquid to get into the inner cylinder 21.

It will be understood that as the liquid rotates in the outer cylinder 10 any heavy coarse sand particles will be traveling with the liquid and at substantially the speed thereof. As the liquid reaches the cylinder 21 it must flow down and substantially change its direction of flow in order to pass through the passages 22 into the cylinder 21. The heavy solid particles resist this tendency to change direction and tend to continue in the same direction so that they are no longer carried by the liquid as it enters the inner cylinder 21. Substantially all of the heavy particles thus drop prior to the entry of the liquid to the inner cylinder. These particles thus settle to the bottom of the tank 10 from whence they may be withdrawn through the discharge valve 13 and hose 14.

The centrifuging action, of course, is at a minimum within the inner cylinder 21 due to the fact that the liquid must change its direction of rotation as it enters the inner cylinder 21 and also due to the fact that the liquid within this cylinder is rising as it enters the overflow passage 27. In the event that there is any tendency for more of the solid particles to settle from the liquid within the inner cylinder 21, they will strike the conical bottom 25 of the cylinder and thence be directed toward the outer periphery of the inner cylinder 21 and out through the openings 22 at the bottom thereof from where they may settle to the bottom of the outer cylinder 10.

As already mentioned heretofore, the downwardly projecting conical surface 26 cooperates in conjunction with the conical surface 11 to effect better centrifuging of the liquid within the lower regions of the chamber 10 and prevents turbulence beneath the inner cylinder 21 which would otherwise occur in the absence of the conical surface 26.

The baffle plate 28 in the overflow passage 27 tends to prevent or minimize turbulence in the liquid overflowing through the outlet passage 27.

By regulating the valve 13 or by raising or lowering the hose 14 the output of sludge containing settled solid particles can be regulated to thereby control the overall efficiency of the separator device in removing the solid particles from the liquid.

It is contemplated that numerous changes and modifications may be made in the present invention without departing from the spirit or scope thereof.

What is claimed is:

1. A device for separating solid particles from a flowing liquid and comprising a substantially cylindrical tank having a generally conically shaped tapered bottom provided with a discharge opening at the apex thereof, means defining a liquid inlet for said tank, said inlet being so disposed with respect to said tank for directing the flowing liquid into the tank in such a manner as to cause rotary flow of the liquid in the tank and consequent centrifuging of the liquid, an inner generally cylindrically shaped tank disposed within the first-named tank and having axially extending openings peripherally spaced therearound, a plurality of vanes respectively provided for said openings for substantially reversing the direction of rotation of the liquid as it passes from the first-named tank into the inner tank, whereby a substantial proportion of the solid particles settle to the bottom of the first-named tank and may be withdrawn therefrom through said discharge opening, said inner tank including means defining a generally conically shaped tapered bottom portion having an upwardly projecting apex extending into said inner tank and effective to direct any particles which settle out of the liquid in said inner tank through said openings in said inner tank into the outer first-named tank, and means forming an overflow for said inner tank for conveying therefrom the cleaned liquid from which the settled solid particles have been removed.

2. A device for separating solid particles from a flowing liquid and comprising a substantially cylindrical tank having a generally conically shaped tapered bottom provided with a discharge opening at the apex thereof, means defining a liquid inlet for said tank, said inlet being disposed substantially tangentially with respect to said tank for directing the flowing liquid into the tank in such a manner as to cause rotary flow of the liquid in the tank and consequent centrifuging of the liquid, an inner generally cylindrically shaped tank disposed within the first-named tank, said inner tank including means defining a generally conically shaped tapered bottom portion having a downwardly projecting apex and effective in conjunction with the tapered bottom of the first-named tank to facilitate centrifuging of the liquid, said inner tank including means defining a plurality of axially extending openings peripherally spaced therearound, said inner tank also including means defining a plurality of inwardly directed vanes respectively provided for said openings for substantially reversing the direction of rotation of the liquid as it passes from the first-named tank into the inner tank, whereby a substantial proportion of the solid particles settle to the bottom of the first-named tank and may be withdrawn therefrom through said discharge opening, said inner tank including means defining a generally conically shaped tapered bottom portion having an upwardly projecting apex extending into said inner tank and effective to direct any particles which settle out of the liquid in said inner tank through said openings in said inner tank into the outer first-named tank, and means forming an overflow for said inner tank for conveying therefrom the cleaned liquid from which the settled solid particles have been removed.

3. A device for separating solid particles from a flowing liquid and comprising a substantially cylindrical tank having a generally conically shaped tapered bottom provided with a discharge opening at the apex thereof, means defining a liquid inlet for said tank, said inlet being disposed substantially tangentially with respect to said tank for directing the flowing liquid into the tank in such a manner as to cause rotary flow of the liquid in the tank and consequent centrifuging of the liquid, an inner generally cylindrically shaped tank disposed within the first-named tank and having axially extending openings peripherally spaced therearound, a plurality of vanes respectively provided for said openings for substantially reversing the direction of rotation of the liquid as it passes from the first-named tank into the inner tank, whereby a substantial proportion of the solid particles settle to the bottom of the first-named tank and may be withdrawn therefrom through said discharge opening, said inner tank including means defining a conically shaped tapered bottom portion having an upwardly projecting apex extending into said inner tank and effective to direct any particles which settle out of the liquid in said inner tank through said openings in said inner tank into the outer first-named tank, means forming an overflow for said inner tank for conveying therefrom the cleaned liquid from which the settled solid particles have been removed, and means for regulating the flow through said discharge opening and thereby controlling the effectiveness of the device.

References Cited in the file of this patent

UNITED STATES PATENTS

| | | |
|---|---|---|
| 775,664 | McVeety | Nov. 22, 1904 |
| 967,849 | Steiner | Aug. 16, 1910 |
| 2,071,975 | Holm-Hansen et al. | Feb. 23, 1937 |
| 2,259,029 | Fisher | Oct. 14, 1941 |
| 2,364,405 | Trimbey et al. | Dec. 5, 1944 |